US010480605B2

(12) United States Patent
Ruhlman et al.

(10) Patent No.: US 10,480,605 B2
(45) Date of Patent: Nov. 19, 2019

(54) COMPRESSION-RESISTANT SHOCK ABSORBER PISTON SEAL

(71) Applicant: RIDE CONTROL, LLC., Troy, MI (US)

(72) Inventors: David L. Ruhlman, Macomb Township, MI (US); Paul Przybyl, Sterling Heights, MI (US)

(73) Assignee: RIDE CONTROL, LLC, Farmington Hills, MI (US)

( * ) Notice: Subject to any disclaimer, the term of this patent is extended or adjusted under 35 U.S.C. 154(b) by 0 days.

(21) Appl. No.: 14/266,826

(22) Filed: May 1, 2014

(65) Prior Publication Data
US 2014/0326556 A1 Nov. 6, 2014

Related U.S. Application Data

(60) Provisional application No. 61/889,737, filed on Oct. 11, 2013, provisional application No. 61/818,558, filed on May 2, 2013.

(51) Int. Cl.
F16F 9/36 (2006.01)
(52) U.S. Cl.
CPC .................. F16F 9/368 (2013.01)
(58) Field of Classification Search
CPC ....... F16F 9/368; F16F 9/36; F16J 9/02; F16J 15/32
USPC ....... 188/322.18, 322.14; 277/309, 436, 440, 277/447
See application file for complete search history.

(56) References Cited

U.S. PATENT DOCUMENTS

| 2,386,873 | A | | 10/1945 | Mercier | |
| 2,507,267 | A | * | 5/1950 | Patriquin | F16F 9/34 188/129 |
| 2,792,914 | A | | 5/1957 | Benard | |
| 3,502,004 | A | | 3/1970 | Schrader | |
| 3,583,712 | A | * | 6/1971 | Domros et al. | 277/440 |

(Continued)

FOREIGN PATENT DOCUMENTS

CN 201461827 5/2010

OTHER PUBLICATIONS

International Search Report for PCT/US2014/036373 dated Sep. 12, 2014.

(Continued)

Primary Examiner — Thomas W Irvin
(74) Attorney, Agent, or Firm — Greer, Burns & Crain, Ltd.

(57) ABSTRACT

A shock absorber including a cylinder having a first chamber and a second chamber where at least one of the first chamber and the second chamber includes a fluid. A piston is configured for reciprocal movement within the cylinder and defines at least one through-hole for enabling the fluid to move between the first and second chambers. A floating disc and a floating retainer are each movably connected to the piston, the floating disc and the floating retainer defining a space between the floating disc and the floating retainer, the space having a cross-sectional area. A seal element is seated in the space and has a cross-sectional area equal to the cross-sectional area of the space where an entire surface of the seal element engages and forms a seal with an inner wall of the cylinder during the reciprocal movement of the piston.

19 Claims, 5 Drawing Sheets

(56) References Cited

U.S. PATENT DOCUMENTS

| | | | |
|---|---|---|---|
| 3,828,897 A * | 8/1974 | Nandyal | 188/317 |
| 4,030,715 A | 6/1977 | Duran | |
| 4,089,534 A * | 5/1978 | Litherland | 277/566 |
| 4,280,601 A * | 7/1981 | Patriquin | F16F 9/3405 |
| | | | 137/529 |
| 4,387,902 A * | 6/1983 | Conover | F16J 15/324 |
| | | | 277/560 |
| 4,457,498 A * | 7/1984 | Pauliukonis | 267/130 |
| 4,577,874 A | 3/1986 | Zitting | |
| 4,877,115 A | 10/1989 | Bauer et al. | |
| 4,989,700 A | 2/1991 | Popjoy | |
| 5,167,419 A * | 12/1992 | Robertson | 277/552 |
| 5,253,877 A * | 10/1993 | DeBiasse et al. | 277/437 |
| 5,460,251 A * | 10/1995 | Jeffries | E05F 1/16 |
| | | | 188/282.1 |
| 5,921,556 A | 7/1999 | Bauman et al. | |
| 6,036,191 A | 3/2000 | Millard | |
| 6,253,888 B1 | 7/2001 | Bell | |
| 6,311,813 B1 * | 11/2001 | Lauderbach et al. | 188/322.18 |
| 6,352,145 B1 * | 3/2002 | DeMolina | F16F 9/48 |
| | | | 188/281 |
| 7,140,291 B2 * | 11/2006 | Dunaevsky et al. | 92/253 |
| 7,207,580 B2 | 4/2007 | Howard | |
| 7,735,834 B2 * | 6/2010 | Hofbauer | 277/438 |
| 8,333,270 B2 * | 12/2012 | Ji | F16F 9/5126 |
| | | | 188/282.8 |
| 2002/0158424 A1 * | 10/2002 | Yanagiguchi | F16J 15/102 |
| | | | 277/650 |
| 2003/0006539 A1 * | 1/2003 | Bertram et al. | 267/120 |
| 2004/0046144 A1 * | 3/2004 | Yanagiguchi | B62D 5/083 |
| | | | 251/335.1 |
| 2009/0289418 A1 * | 11/2009 | Cook | 277/309 |
| 2010/0012450 A1 | 1/2010 | Ji et al. | |
| 2010/0018279 A1 | 1/2010 | Roupp | |
| 2015/0076753 A1 * | 3/2015 | Cotter | 267/124 |

OTHER PUBLICATIONS

Supplemental European Search Report in European Patent Application No. 14791420.4-1755 / 2992241 dated Nov. 9, 2016.

* cited by examiner

COMPRESSION-RESISTANT SHOCK ABSORBER PISTON SEAL

PRIORITY CLAIM

The present non-provisional application claims priority to and the benefit of U.S. Provisional Application No. 61/818,558 filed on May 2, 2013, and U.S. Provisional Application No. 61/889,737 filed on Oct. 11, 2013, which are hereby incorporated by reference in their entireties.

BACKGROUND

Hydraulic telescoping shock absorbers are comprised of precision tubes, rods, valves, seals and bearing elements filled with hydraulic oil. The piston valve, and more specifically, the valve body, separates the valve into a rebound side and a compression side and controls the rebound and compression flow of the oil to provide controlled damping. A seal element or seal around the valve body is designed to minimize or eliminate oil bypassing the valve body which affects the performance of the shock absorber. The force developed by the pressure drop of the oil across the piston valve is transmitted by the piston rod to a vehicle body to which the shock absorber is attached.

The piston valve (also known as the "cage valve") is unique to all other damping valves in that the seal element, housed between a floating retainer 10 and floating disc 11, moves relative to the valve body 12 by hydraulic pressure in the damper compression direction against a spring 13 to control compression damping forces. FIG. 1 shows the valve in the closed position and FIGS. 1A and 4 show the valve in the open position. In particular, the floating disc 11 identified in the drawings is shown in the closed and opened positions, respectively allowing a different flow path through the valve body 12. The compression and rebound flow patterns are identified in FIGS. 1, 1A and 4.

The piston valve or cage valve is also unique in that it enables oil flow from the center of the piston valve to the end of the piston rod 14 by being threaded directly to the end of the piston rod without an additional fastener, i.e. nut, bolt, screw, etc. secured to the piston rod.

The prior art seal element 15 design shown in FIGS. 1, 1A and 2 has a round cross-section with a single small contact surface area against the cylinder wall 16. This small contact area does not provide an adequate seal with the cylinder wall and over time deteriorates, resulting in insufficient sealing ability and pressure leakage which negatively affects the performance of the shock absorber. Additionally, the round cross-section seal element 15 deforms into an oblong cross-section during compression of the seal element, resulting in a single contact point with the cylinder wall 16. Repeated reciprocal movement of the seal element 15 in the cylinder causes the portion of the seal element at the single contact point to rub against the cylinder wall 16 and wear out prematurely. As the seal element 15 wears, the seal formed between the seal element and the cylinder wall 16, i.e., the effectiveness of the seal, decreases thereby reducing the function and effectiveness of the shock absorber cross-section.

SUMMARY

A shock absorber seal with an increased sealing surface area is therefore desirable to reduce low speed variation and for enhancing shock absorption during rebound and compression.

An improved seal element for a shock absorber is provided that reduces low speed oil leakage between the piston sealing element and the cylinder wall by changing the geometry and fit of the seal element and how it interfaces with the piston carrier and inner cylinder.

In an embodiment, a shock absorber is provided that includes a cylinder having a first chamber and a second chamber, where at least one of the first chamber and the second chamber includes a fluid. A piston is configured for reciprocal movement within the cylinder and defines at least one through-hole for enabling the fluid to move between the first and second chambers. A floating disc and a floating retainer are each movably connected to the piston, the floating disc and the floating retainer defining a space between the floating disc and the floating retainer, the space having a cross-sectional area. A sealing element is seated in the space and has a cross-sectional area equal to the cross-sectional area of the space where an entire surface of the sealing element engages and forms a seal with an inner wall of the cylinder during the reciprocal movement of the piston.

In another embodiment, a shock absorber is provided and includes a cylinder having a first chamber and a second chamber, where at least one of the first chamber and the second chamber includes a fluid. A piston having a valve body that separates the first chamber and the second chamber is configured for reciprocal movement within the cylinder, the valve body defines at least one through-hole for enabling the fluid to move between the first and second chambers. A floating disc and a floating retainer are each movably connected to the valve body, where the floating disc and the floating retainer define a space between the floating disc and the floating retainer. A sealing element is seated in the space and has a square cross-section where an entire first surface of the sealing element engages at least one inner surface of the floating disc and the floating retainer, and an entire second surface of the sealing element engages and forms a seal with an inner wall of the cylinder during the reciprocal movement of the piston.

DETAILED DESCRIPTION

Figure 1:
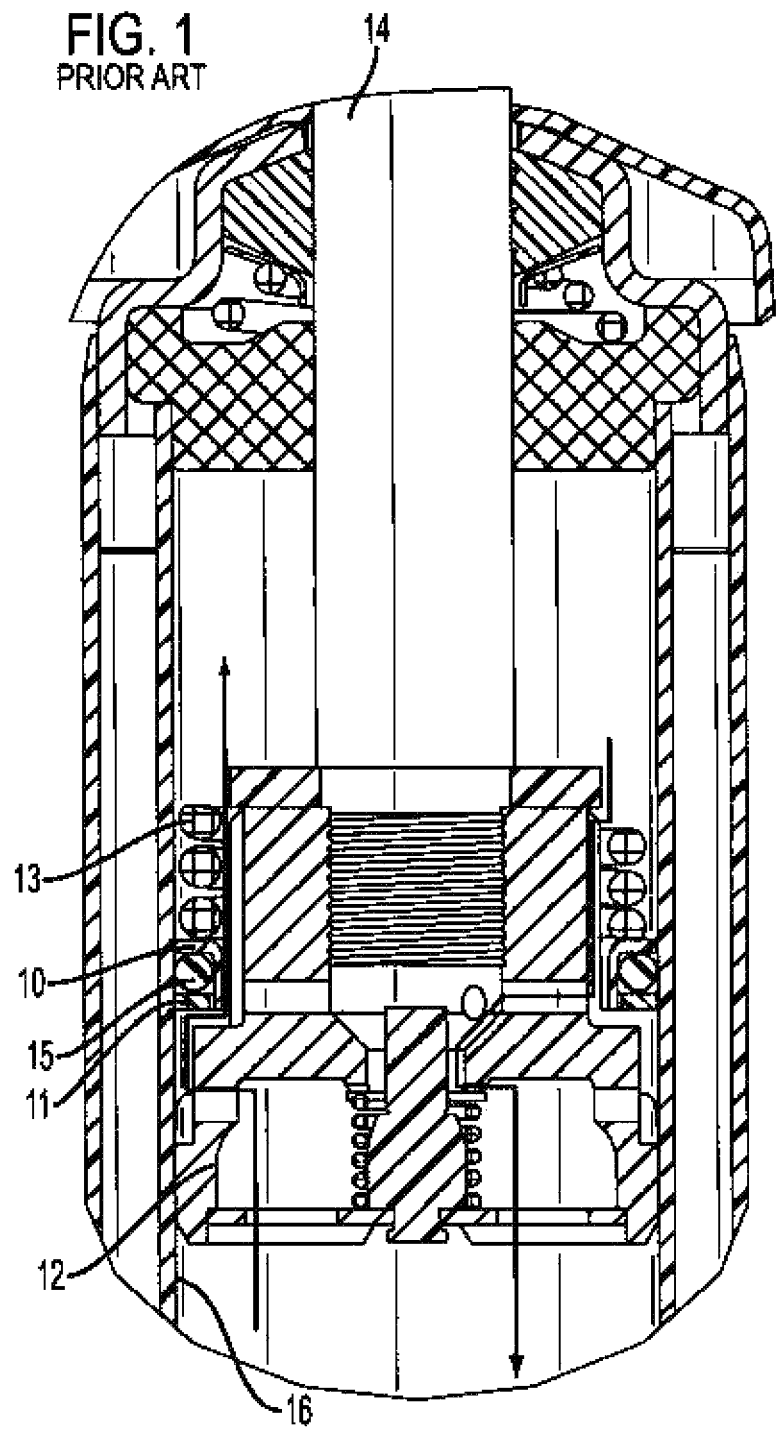
FIG. 1 is a fragmentary cross-section of a shock absorber having the prior art design.
Figure 2:
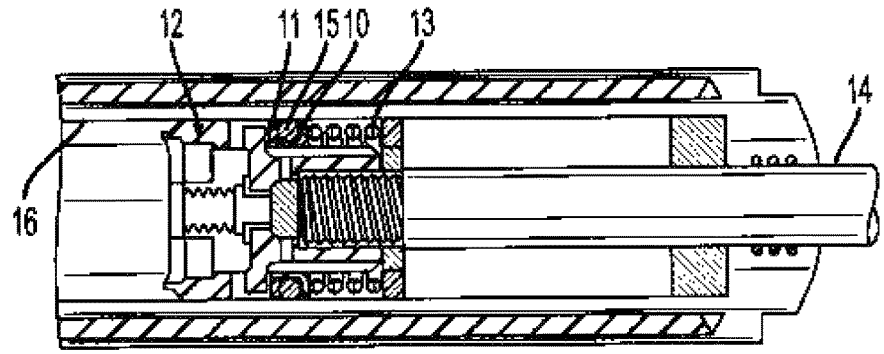
FIG. 2 is a fragmentary cross-section of the shock absorber of FIG. 1 showing the shock absorber in a closed position.
Figure 3:
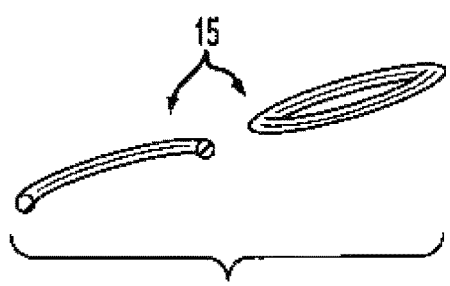
FIG. 3 is a perspective view of a prior art seal element.
Figure 4:
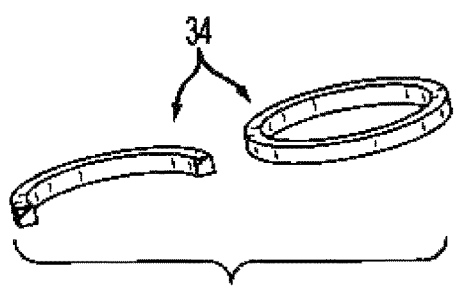
FIG. 4 is a perspective view of an embodiment of the present seal element.
Figure 5:
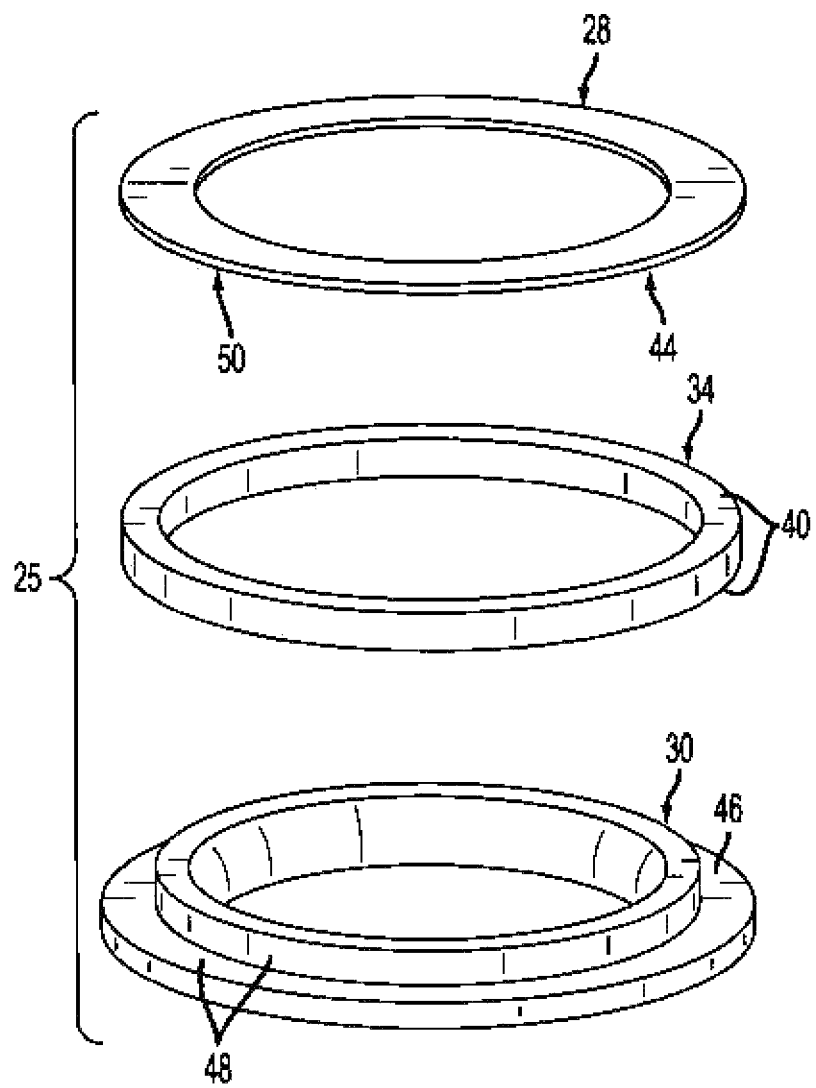
FIG. 5 is an enlarged, exploded perspective view of the floating disc, the seal element of FIG. 4 and the floating retainer.

Referring to FIGS. 1-7(f), to improve the sealing ability and effectiveness of the present seal element, more surface area against the cylinder wall is provided. Rather than a single point of contact from a round seal element or seal element with a circular or round cross-section, a flat surface abutting the cylinder wall is used for increasing the sliding surface contact between the seal element and the cylinder wall and thereby enhancing the seal formed between the seal element and the cylinder wall (FIG. 4). Specifically, the present seal element preferably has a square cross-section to enhance the seal between the seal element and the cylinder wall as described below. It should be appreciated that the seal element may have variety of different cross-sections including a flat surface for enhancing the surface contact between the sealing element and the cylinder wall and improve its sealing ability. An example of a sealing element having a cross-section with a flat contact surface is a quadrilateral- or polygon-shaped sealing element including a trapezoid-, rectangle- or square-shaped sealing element (FIG. 5). Additionally as shown in FIG. 7, it should be appreciated that a sealing element may have a triangular shaped cross-section or any polygonal shape which provides a flat surface to abut and form a seal with the cylinder wall 14 may be used.

Figure 6:
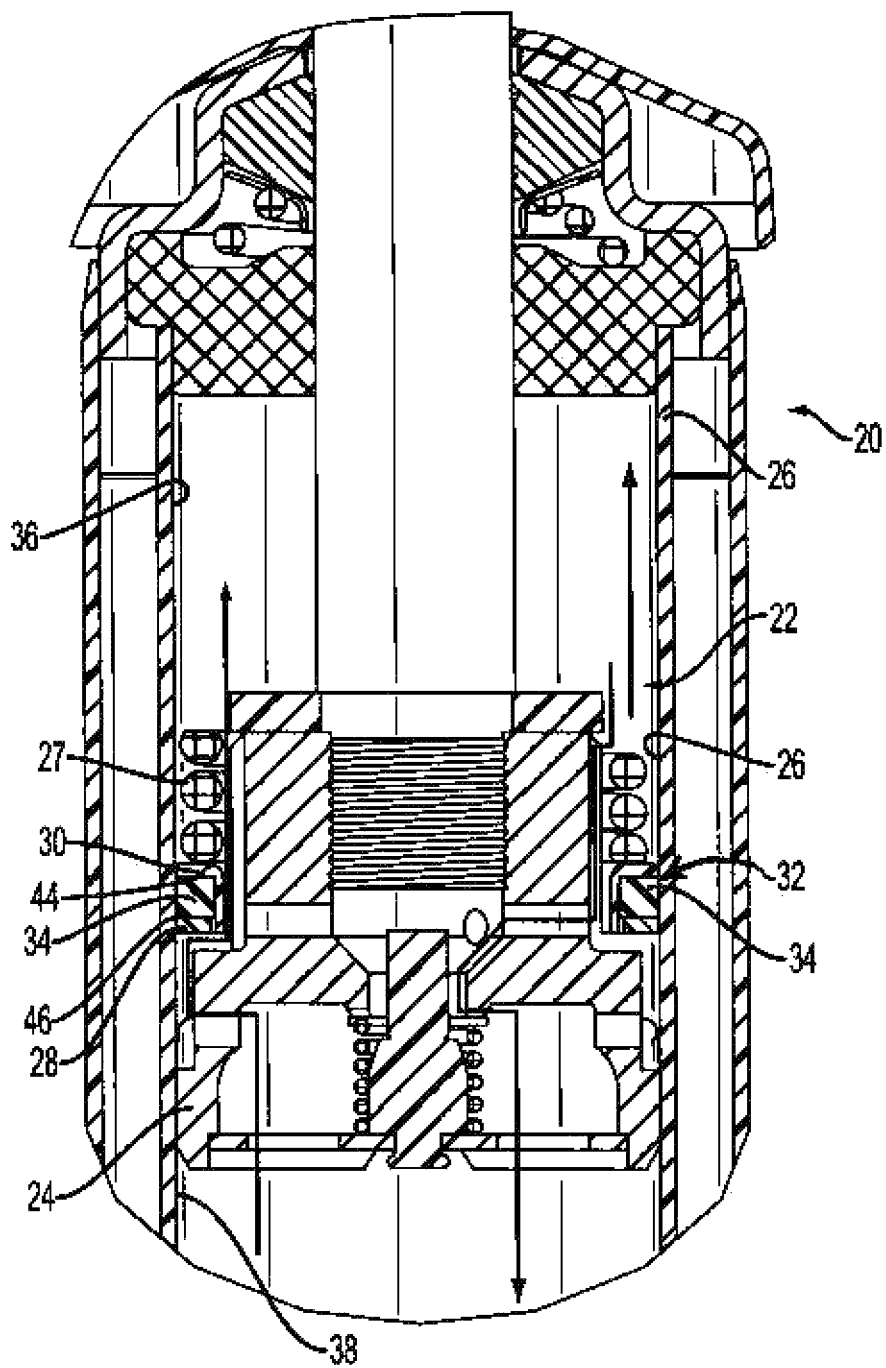
FIG. 6 is a fragmentary cross-section view of a shock absorber including the seal element of FIG. 4.
Figure 7A:
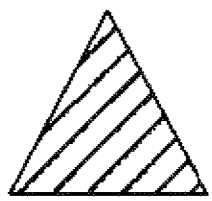
FIGS. 7(a)-7(f) depict vertical cross-sections of further embodiments of the seal element.
Figure 7B:
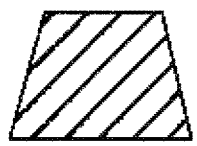
Figure 7C:
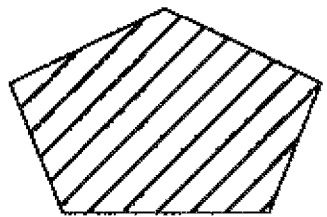
Figure 7D:
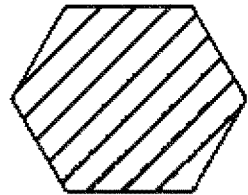
Figure 7E:
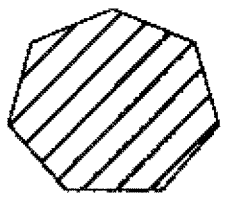
Figure 7F:
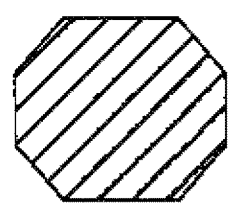

As shown in FIGS. 5-6, the shock absorber 20 includes a piston valve 22 having a valve body 24 biased by a spring 27 such that the valve body reciprocates within a cylinder 26 during rebound and compression of the shock absorber. The valve body 24 includes a seal assembly 25 having a floating disc 28, a floating retainer 30 and a seal element 34, where the disc and the retainer move relative to each other and also relative to the cylinder 26, and define a space 32 therebetween for retaining the present seal element, such as a seal element 34 having a square cross-section. The seal element 34 is preferably made of Nitrile Butadiene Rubber (NBR) and has a 90 durometer hardness. It should be appreciated that the seal element 34 may be made of any suitable material including, but not limited to, NBR, HNBR, Viton, Torlon, PTFE, Nylon, Delrin, or any other suitable polymer, elastic or hyper elastic material. It should also be appreciated that the present sealing element may have any suitable hardness.

During rebound and compression of the shock absorber 20, the seal element 34 contacts an inner surface 36 of a cylinder wall 38 of the cylinder 26 to form a seal with the wall. As shown in FIGS. 4 and 5, the seal element 34 has a flat or planar outer surface 40 that fully contacts the opposing flat inner surface 36 of the cylinder wall 38 and thereby increases the surface contact between the seal element and the wall as compared to conventional seal elements having round cross-sections.

Also, during rebound and compression of the shock absorber 20, the floating disc 28 and the floating retainer 30 move relative to the valve body 24 and to each other due to a biasing force on the retainer by a biasing member, such as a compression spring or a coil spring 42 (FIG. 6). Both the floating disc 28 and the floating retainer 30 have generally flat or planar inner surfaces 44 and 46 that engage the corresponding flat outer surfaces 40 (FIG. 5) of the seal element 34, resulting in the entire surfaces of the floating disc 28 and/or the floating retainer 30 and the sealing element being in contact with each other. The full side or full surface contact between the floating disc 28 and the seal element 34 and/or the floating retainer 30 and the sealing element 34 more uniformly distributes the force or pressure on the sealing element across the entire surface of the sealing element, as opposed to a smaller contact area or single point contact area provided by conventional seal elements.

Further, as seen in FIGS. 5 and 6, the square cross-section or square shape of the seal element 34 corresponds to the shape of the space 32 defined between the floating disc 28 and the floating retainer 30 such that clearance between the seal element 34 and the floating disc and floating retainer is reduced compared to the conventional circular cross-section seal elements. In the preferred embodiment, the present seal element 34 is dimensioned to substantially fill the space 32 defined between the floating disc 28 and the floating retainer 30. More specifically, and referring to FIG. 5, the two planar seal-engaging surfaces 48 of the floating retainer 30, defining a general "L"-shape, and the planer seal-engaging surface 50 of the floating disc 28, combine to define the space 32, which has a generally polygonal or square vertical cross-section. Thus, the preferably square cross-section of the present seal element 34 substantially fills the space 32. At the same time, the resilience of the seal element 34 accommodates the relative squeezing movement of the floating disc 28 towards the floating retainer 30 during shock absorber operation. The increased surface contact between the seal element 34 and the floating disc 28 and retainer 30 and the reduction in the space between these components combine to decrease the amount of deformation of the seal element during the rebound and compression of the shock absorber 20. Less deformation of the seal element 34 helps to maintain the enhanced surface area seal between the seal element and the cylinder wall 38. Additionally, the complementary dimensional relationship between the present seal element 34 and the associated space 32 prolongs the life of the seal element, as the wear on the surfaces of the seal element are more uniform than with a single point contact or smaller contact surface area between the seal element and the wall 38. In this regard, the improved design of the seal element 34 has increased the life of the seal element by approximately seven times (7x) over conventional seal elements from 200,000 cycles to 1.4 million piston cycles in the shock absorber.

As described above, the increased surface area contact between the present seal element 34 and the cylinder wall 38 and the reduction in the compression and resulting deformation of the seal element minimizes the pressure leakage between the two sides of the valve body that may result from a single point of contact or small contact area as with conventional seal elements having round cross-sections. Further, the increased contact surface area minimizes losses due to wear and deformation and results in more consistent absorption of shock forces over time.

While particular embodiments of the shock absorber and piston seal have been described herein, it will be appreciated by those skilled in the art that changes and modifications may be made thereto without departing from the invention in its broader aspects and as set forth in the following claims.

What is claimed is:

1. A shock absorber comprising:
  a cylinder having a first chamber and a second chamber, at least one of said first chamber and said second chamber including a fluid;
  a piston configured for reciprocal movement within said cylinder and defining at least one through-hole for enabling the fluid to move between the first and second chambers;
  a floating disc and a floating retainer each movably connected to said piston and movable relative to each other, said floating disc and said floating retainer defining a space between said floating disc and said floating retainer, said space having a cross-sectional area, said floating disc and said floating retainer each including an inner surface; and
  a compressible seal element seated in said space and having a non-compressed triangular cross-sectional area equal to said cross-sectional area of said space with at least one flat side, said seal element being non-fixedly attached to and movable relative to said floating disc and said floating retainer;

wherein said at least one flat side of said seal element uniformly, slidingly engages and forms a seal with an inner wall of said cylinder during the reciprocal movement of said piston to enable continuous sliding reciprocal movement of the seal element relative to said inner wall of said cylinder while reducing wear on said seal element and increasing the life of said seal element during repeated reciprocal movement of said seal element.

2. The shock absorber of claim 1, wherein said piston includes a valve body and said floating disc and said floating retainer are attached to said valve body.

3. The shock absorber of claim 1, wherein said seal element has a polygonal cross-section.

4. The shock absorber of claim 1, wherein said floating retainer has an L-shaped cross section.

5. The shock absorber of claim 1, wherein said seal element is made of rubber.

6. The shock absorber of claim 1, wherein said seal element is made of Nitrile Butadiene Rubber.

7. The shock absorber of claim 1, wherein said seal element has a durometer hardness of 90.

8. The shock absorber of claim 1, wherein said fluid is hydraulic fluid.

9. A shock absorber comprising:
a cylinder having a first chamber and a second chamber, at least one of said first chamber and said second chamber including a fluid;
a piston having a valve body that separates said first chamber and said second chamber and being configured for reciprocal movement within said cylinder, said valve body defining at least one through-hole for enabling the fluid to move between the first and second chambers;
a floating disc and a floating retainer each being movably connected to said valve body and movable relative to each other, said floating disc and said floating retainer defining a space between said floating disc and said floating retainer, said space having a cross-sectional area; and
a compressible seal element having a non-compressed square cross-section seated in and filling said cross-sectional area of said space, said seal element being non-fixedly attached to and movable relative to said floating disc and said floating retainer, an entire first outer surface of said seal element engages an entire first inner surface of said floating disc and said floating retainer, an entire second outer surface of said seal element engages an entire second inner surface of said floating disc and said floating retainer, and a third outer surface of said seal element uniformly, slidingly engages and forms a seal with an inner wall of said cylinder during the reciprocal movement of said piston to enable continuous sliding reciprocal movement of the seal element relative to said inner wall of said cylinder while reducing wear on said seal element and increasing the life of said seal element during repeated reciprocal movement of said seal element.

10. The shock absorber of claim 9, wherein said floating retainer has an L-shaped cross section.

11. The shock absorber of claim 9, wherein said seal element is made of rubber.

12. The shock absorber of claim 11, wherein said seal element has a durometer hardness of 90.

13. The shock absorber of claim 9, wherein said seal element is made of Nitrile Butadiene Rubber.

14. The shock absorber of claim 13, wherein said seal element has a durometer hardness of 90.

15. The shock absorber of claim 9, wherein said fluid is hydraulic fluid.

16. A shock absorber comprising:
a cylinder having a first chamber and a second chamber, at least one of said first chamber and said second chamber including a fluid;
a piston configured for reciprocal movement within said cylinder and defining at least one through-hole for enabling the fluid to move between the first and second chambers;
a floating disc and a floating retainer each movably connected to said piston and movable relative to each other, said floating disc and said floating retainer defining a space between said floating disc and said floating retainer, said space having a cross-sectional area, said floating disc and said floating retainer each including an inner surface; and
a compressible seal element seated in said space and having a non-compressed polygonal cross-sectional area with four sides equal to said cross-sectional area of said space, wherein two opposing sides of said four sides are flat and equidistant from each other along an entire length of said two opposing sides, said seal element being non-fixedly attached to and movable relative to said floating disc and said floating retainer;
wherein one of said two opposing sides of said seal element uniformly, slidingly engages and forms a seal with an inner wall of said cylinder during the reciprocal movement of said piston to enable continuous sliding reciprocal movement of the seal element relative to said inner wall of said cylinder while reducing wear on said seal element and increasing the life of said seal element during repeated reciprocal movement of said seal element.

17. The shock absorber of claim 16, wherein said floating retainer has an L-shaped cross section.

18. The shock absorber of claim 16, wherein said seal element is made of rubber.

19. The shock absorber of claim 16, wherein said seal element is made of Nitrile Butadiene Rubber.

* * * * *